United States Patent Office 3,541,127
Patented Nov. 17, 1970

3,541,127
SILOXANE-POLYOXYALKYLENE COPOLYMERS
James Hughes Beattie, Stevenston, and Ronald Sangster Stuart, Saltcoats, Scotland, assignors to Imperial Chemical Industries Limited, Millbank, London, England, a corporation of Great Britain
No Drawing. Continuation of application Ser. No. 481,914, Aug. 23, 1965. This application Dec. 16, 1968, Ser. No. 785,437
Claims priority, application Great Britain, Sept. 14, 1964, 37,471/64
Int. Cl. C07f 7/18, 7/04
U.S. Cl. 260—448.8                17 Claims

ABSTRACT OF THE DISCLOSURE

Siloxane-oxyalkylene copolymers in which the oxyalkylene or polyoxyalkylene groups or chains are attached directly to silicone atoms and are produced by reacting in the presence of a catalyst a polysiloxane containing a silicon-bonded hydrogen atom with a monohydric alcohol.

---

This case is a continuation of U.S. Ser. No. 481,914, filed Aug. 23, 1965 and now abandoned.

This invention relates to polymeric organosilicon compositions, more particularly to new siloxane-oxyalkylene copolymers.

Siloxane-oxyalkylene block copolymers are known to be of value as additives in the preparation of polyurethane foams. It is also known, for example, from United Kingdom specification No. 802,467 to make siloxane-oxyalkylene copolymers in which the polyoxyalkylene chains are attached to silicon atoms through a divalent aliphatic radical.

It has now been found that new and useful siloxane-oxyalkylene copolymers in which the oxyalkylene or polyoxalkylene groups or chains are attached directly to silicon atoms can be readily produced by reacting a polysiloxane containing silicon-bonded hydrogen with a monohydric alcohol having the general formula H(OC$_n$H$_{2n}$)$_m$R' where R' is a radical derived from a compound R'H wherein H is a hydrogen atom capable of reaction with a cyclic oxide, $n$ is an integer having a value of 2 to 4 inclusive and $m$ is a positive integer. These new siloxane-oxyalkylene copolymers have been found to be of value as additives in the manufacture of polyurethane foams, in particular by the simultaneous reaction of secondary hydroxy-ended polyethers, organic polyisocyanates and water using the hitherto known general methods.

According to the present invention we provide siloxane-oxyalkylene copolymers produced by reacting a monohydric alcohol of the kind described with a siloxane of the general formula

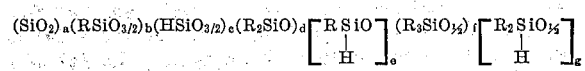

where R represents a monovalent hydrocarbon or substituted hydrocarbon group, $a$, $b$, $c$, $d$, $e$, $f$ and $g$ being zero or a small postive number, $a+b+c$ being a positive number, $d+e$ being not less than 1, $c+e$ being a positive number and $f+g$ being equal to $2a+b+c+2$, provided that if $c$ is 1, $a+b+e+f$ is a positive number.

While $a$, $b$ and $c$ may be zero or a small postive number it is in general preferred that they should be not greater than 5. It is also normally preferred that $d$ should be not greater than 100 for many purposes it is further preferred that it should have a value of from 5 to 50. In many cases $e$ is preferred to have a value not greater than 20. It is also preferred that $a+b+c$ should be not greater than $\frac{1}{8}(d+e)$.

Polysiloxanes which are particularly useful in forming the copolymers of our invention are of the following general formulae (I) 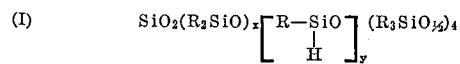

where R is as above-defined, $x$ is zero or a positive number not greater than 100 and $Y$ is a positive number not greater than 100.

(II) 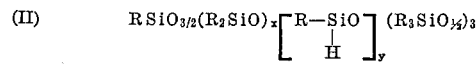

(III) 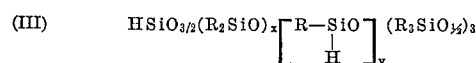

(IV) 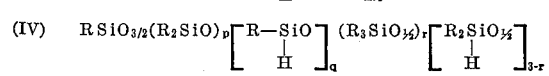

where $p$ is zero or a positive number not greater than 100, $q$ is a positive number not greater than 100 and $r$ is zero or a positive number not greater than 3.

(V) 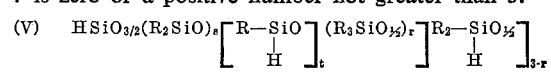

where $s$ is zero or a positive number not greater than 100, $t$ is a positive number not greater than 100 and $s+t$ is not greater than 100.

(VI)    (HSiO$_{3/2}$)$_m$(R$_2$SiO)$_n$(R$_3$SiO$_{1/2}$)$_{m+2}$ where $m$ is a positive number not greater than 5 and $n$ is a positive number not less than $8m$ or greater than 100.

The organo group R may be any monovalent hydrocarbon group, for example, a methyl, ethyl, propyl, butyl, cyclohexyl, phenyl, tolyl, benzyl or phenylethyl group. In many cases it is preferred that R be a methyl group.

The group R' may be, for example, a methoxy, ethoxy, propoxy, butoxy, octyloxy, octadecyloxy, cyclohexyloxy, benzyloxy, phenoxy, t-butylphenoxy, octylcresoxy, dimethylamino, diethylamino, phenylmethylamino, morpholino or benzoylmethylamino group.

The oxyalkylene residue OC$_n$H$_{2n}$ may be, for example, oxyethylene, oxy-1,2-propylene, oxy-1,3-propylene, oxy-1,2-butylene or oxy-1,4-butylene. The unit (OC$_n$H$_{2n}$)$_m$, when polymeric may be a homoploymer or a copolymer containing different oxyalkylene units. Copolymers may be either random copolymers or block copolymers.

It is preferred to carry out the reaction in the presence of a catalyst of the type known to be effective in reactions of this general type, for example, bases, acids, Friedel-Crafts halides, or metallic salts and complexes.

Particularly active catalysts are strong alkalis, especially alkali metal alkoxides such as sodium or potassium methoxide, or alkali metal derivatives of the monorydric alcohol which it is desired to react. Such alkali metal alkoxide catalysts are not, however, always completely satisfactory. This is particularly apparent when making graft copolymers from hydrophilic polyethers of high molecular weight of the order of 1500 or higher. In such cases it is difficult, if not impossible, to obtain a homogeneous single-phase product by the use of an alkoxide catalyst, and the mixture of products so obtained is usually ineffective as a surface-active additive for making podlyurethane foams. It has been found, surprisingly, that these difficulties may be avoided by using as catalysts certain media, such as carboxylic acid salts, or divalent tin or lead, or of dialkyl tin. Examples of particularly suitable catalysts are stannous octoate, lead octoate and dibutyl tin dilaurate. The use of these preferred catalysts enables the preparation, without difficulty, of homogeneous condensates which are extremely active as surface-active additives in the manufacture of polyurethane foams. Furthermore, even in those cases where it is possible to make a homogeneous product by use of an alkoxide catalyst, it is frequently found that the use of the aforedescribed metal salt catalysts provides products which are more active, or more reproducible in their properties as additives for polyurethane foams, then similar compositions made with an alkoxide catalyst.

The catalysts are normally used in proportions of from 0.05 to 1.0 percent by weight of the total weight of reactants, although proportions outside this range may be used. The amount of catalyst is preferably kept to the minimum consistent with an acceptable rate of reaction.

The reaction is normally carried out at temperatures of from 20° to 140° C., depending mainly on the catalyst used. It is normally convenient to carry out the reaction in a solvent, for example, an aromatic hydrocarbon.

Generally the weight ratio of the total oxyalkylene groups to the polysiloxane block varies between about 0.5:1 and 10:1 depending on the properties and structure of the components and the properties desired in the copolymer.

The polysiloxane and the monohydric alcohol are normally in approximately stoichiometric amount, and preferable with an excess of up to 10 percent by weight of the alcohol.

In order to avoid the production of undesirable by-products, it has been found advantageous to dry the monohydric alcohol and the solvent before use.

The siloxane-oxyalkylene copolymers of the present application when used as additives in the manufacture of polyurethane foams, confer an exceptional degree of stability on the foaming mass prior to the cure of the foam. Thus the use of such additives enables low density foams of high resilience with an excellent pore structure to be obtained.

The polyurethane foams which are advantageously prepared in the presence of the siloxane-oxyalkylene copolymer of our invention may be prepared from the known foam-forming ingredients, that is by reacting together components capable of forming a polyurethane, under such conditions that a foam-forming gas is generated. Thus they may be prepared by the reaction of hydroxyl group-containing polymers such as polyesters, polyesteramides, or polyethers containing at least two isocyanate-reactive groups per molecule with organic polyisocyanates and water and/or a low boiling point liquid. Such polyurethane products may be prepared, for example, in the form of surface coatings, sheets, shaped articles or adhesive layers.

The polyesters or polyesteramides may be made, for example, from dicarboxylic acids and polyhydric alcohols and, as necessary, minor proportions of diamines or amino-alcohols. Suitable dicarboxylic acids include succinic, glutaric, adipic, suberic, azelaic and sebacic acids as well as aromatic acids such as phthalic, isophthalic and terephthalic acids. Mixtures of acids may, of course, be used. Examples of polyhydric alcohols include glycols such as ethylene glycol, 1,2-propylene glycol, 1,3-butylene glycol, 2,3-butylene glycol, diethylene glycol, tetramethylene glycol, pentamethylene glycol, hexamethylene glycol, decamethylene glycol and 2,2-dimethyltrimethylene glycol. Other polyhydric alcohols containing more than two hydroxyl groups per molecule may be used, for example, trimethylolpropane, trimethylolethane, pentaerythritol, sorbitol and glycerol. Such compounds are included in varying amounts according to the rigidity desired in the products.

In addition to the polyhydric alcohols and dicarboxylic acids there may also be reacted compounds containing more than two groups selected from hydroxyl, carboxyl and secondary and primary amino groups, of which examples include diethanolamine, trimesic acid, dihydroxy-stearic acid and tricarballylic acid.

Examples of diamines and amino-alcohols that may be used to produce polyesteramides include ethylene diamine, hexamethylene diamine, monoethanolamine, phenylene diamines and benzidine.

The polyesters and polyesteramides used according to the process of the present invention normally have molecular weights of from 200 to 5000, with predominantly hydroxyl end groups.

As examples of polyethers for use in the process of the present invention there may be mentioned hydroxyl-ended polymers and copolymers of cylic oxides, for example, 1,2-alkylene oxides such as ethylene oxide, epichlorhydrin, 1,2 - propylene oxide, 1,2 - butylene oxide, 2,3 - butylene oxide, oxacyclobutane and substituted oxacyclobutanes, and tetrahydrofuran. Such polyethers may be linear polyether glycols as are prepared, for example, by the polymerisation of an alkylene oxide in the presence of a basic catalyst, such as potassium hydroxide, and a glycol or a primary mono-amine. Alternatively there may be used branched polyethers prepared, for example, by the polymerisation of an alkylene oxide in the presence of a basic catalyst and a substance having more than two active hydrogen atoms per molecule, for example, ammonia and polyhydroxy compounds such as glycerol, hexane-triols, trimethylolethane, triethanolamine, pentaerythritol, sorbital, sucrose and phenol formaldehyde reaction products, amino-alcohols such as monoethanolamine and diethanolamine and polyamines such as ethylene diamine, hexamethylene diamine, diethyl triamine, tolylene diamine and diaminodiphenylmethane. Branched polyethers may also be produced by copolymerising a cyclic oxide of the type already mentioned with cyclic oxides having a functionality greater than two, for example, di-epoxides, glycidol and 3-hydroxymethyloxacyclobutanes.

The polyethers used in the process of the present invention normally have molecular weights of from 200 to 6000. Mixtures of linear and branched polyethers may be used if desired.

Examples of secondary hydroxyl-ended polyethers include polymers and copolymers of 1,2-alkylene oxides such as propylene and butylene oxides. It is preferred to use polymers and copolymers of propylene oxide, especially those with molecular weights of from 400 to 6000 in which the terminal hydroxyl groups are mainly secondary hydroxyl groups.

Examples of suitable polyisocyanates for the production of polyurethanes include aliphatic diisocyanates such as hexamethylene diisocyanate, aromatic diisocyanates such as tolylene-2,4-diisocyanate,
tolylene-2,6-diisocyanate,
diphenylmethane-4,4'-diisocyanate,
3-methyldiphenylmethane-4,4'-diisocyanate,
m- and p-phenylene diisocyanate,
chlorophenylene-2,4-diisocyanate,
naphthalene-1,5-diisocyanate,
diphenyl-4,4'-diisocyanate,
4,4'-diisocyanato-3,3'-dimethyldiphenyl and
diphenyl ether diisocyanate, and cycloaliphatic diisocyanates such as dicyclohexylmethane diisocyanate. Tri-isocyanates which may be used include aromatic tri-isocyanates such as 2,4,6-tri-isocyanatotoluene and 2,4,4'-tri-isocyanatodiphenyl ether. Examples of other suitable organic polyisocyanates comprise the reaction products of an excess of a di-isocyanate with a polyhydric alcohol such as trimethylolpropane, uretedione dimers and isocyanurate polymers of di-isocyanates, for example, of tolylene-2,4-diisocyanate. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine.

Suitable low-boiling point liquids that are chemically inert towards isocyanates and water and have boiling points not exceeding 75° C. preferably between —40° C. and 50° C. include, for example, halogenated alkanes such as mono-fluorotrichloromethane,
dibromo-difluoromethane,
1,1,2-trichloro-1,2,2-trifluoroethane,
dichlorodifluoromethane,
dichloromonofluoromethane,
dichlorotetrafluoroethene,
monochlorodifluoromethane,
difluoroethyl bromide and
methylene chloride or mixtures thereof. Mixtures of these low boiling liquids one with another and/or with other substituted or unsubstituted hydrocarbons, may also be used.

Such liquids are usually employed in amounts of from 1 to 200 percent preferably from 50 to 125 percent by weight of the hydroxylic polymer.

Water is usually employed in amounts of from 1 to 10 percent by weight of the hydroxyl group-containing polymer, when water is used as the source of carbon dioxide blowing gas.

The preparation of the foamed, cellular polyurethanes may be carried out by the general methods previously described. Thus the materials may be mixed continuously or batchwise and the hydroxyl group-containing polymer may be first reacted with part or the whole of the organic polyisocyanate before the final reaction to give a foam is carried out in a second stage. However, it is generally preferred to carry out the preparation in one stage only, by the simultaneous reaction of the foam-forming ingredients, namely the hydroxyl group-containing polymer, the organic polyisocyanate and the water and/or the low boiling point liquid. This convenient one-stage process cannot be satisfactorily carried out with all hydroxyl group-containing polymers. In particular those polymers containing predominantly secondary hydroxyl end-groups do not normally give satisfactory foams using a one-stage process as defined above. Using such polymers the foam-forming mass usually partially or wholly collapses with considerable loss of gas and the formation of unsatisfactory high density products. The one-stage process gives particularly unsatisfactory results using polyethers having predominantly secondary hydroxyl end groups.

It has been found that the siloxane-oxyalkylene copolymers of the present application are especially valuable as foam-stabilising agents in the preparation of foams by the one-stage process from polyethers in which the terminal hydroxyl groups are mainly secondary hydroxyl groups.

The siloxane-oxyalkylene copolymers may be incorporated into the foam-forming mixture, as such, or may be first mixed with any of the foam-forming ingredients to which they are not reactive, for example, the hydroxyl group-containing polymer or the water, and then added to the other foam-forming ingredients. The siloxane-oxyalkylene copolymers are normally incorporated in amounts of from 0.1 to 5 percent preferably from 0.3 to 3 percent by weight of the hydroxyl group-containing polymer, when used in making "one-shot" foams, that is, foams made in one stage by the simultaneous reaction of hydroxyl group-containing polymer, polyisocyanate and water.

Polyurethane foams may, as is well known, be prepared using a variety of additives including in particular catalysts such as basic materials, for example, tertiary amines, and soluble organic compounds of heavy metals, for example, iron and manganese acetyl acetonate, dibutyl tin dilaurate and stannous octoate. Mixtures of catalysts may often be used with advantage. Other additives include surface-active agents, for example, oxyethylated phenols, fatty alcohols such as oleyl alcohol or sulphated methyl oleate, and alkyl or aryl polysiloxanes, flame-retardants such as beta-trichlorethyl phosphate and antimony oxide, plasticisers such as tricresyl phosphate and dioctyl phthalate, colouring matters and fillers such as carbon black and silica and colour stabilisers and whitening agents. A further class of additives that may be added comprises antioxidants, for example, tert-butyl-catechol and sterically hindered phenols.

Our invention is further illustrated by the following examples in which all parts and percentages are by weight.

EXAMPLE 1

An organopolysiloxane of the average formula

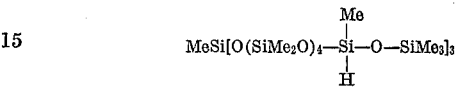

was prepared by cohydrolysing 981 parts of dimethyldichlorosilane, 218.3 parts of methyldichlorosilane, 206 parts of trimethylchlorosilane and 94.7 parts of methyltrichlorosilane, equilibrating the crude cohydrolysate in presence of 2 percent of an acid activated clay at 25° C. to yield a clear colourless oil of viscosity 10.5 centistokes at 25° C. and silicon-bonded hydrogen content 0.20 percent.

A solution of 150 parts of oxyalkylated iso-octanol, of molecular weight 1420 and containing equal proportions by weight of oxyethylene and oxy-1,2-propylene units, in 260 parts of toluene was heated under reflux for 1.5 hours to remove water by azeotropic distillation. 1.2 parts of stannous octoate were then added followed by 54 parts of the organopolysiloxane described above. The mixture was thereafter heated under reflux for 5 hours during which time the theoretical amount of hydrogen was evolved. The solvent was distilled off under reduced pressure to yield a pale straw coloured liquid copolymer of viscosity 630 centistokes at 25° C.

EXAMPLE 2

95 parts of a 1,2-propylene oxide adduct of glycerol, of molecular weight 3000, 0.3 part of stannous octoate in 5 parts of the same propylene oxide adduct of glycerol and a solution of 0.1 part of triethylenediamine and 1.0 part of the copolymer of Example 1 in 3.0 parts of water were thoroughly mixed with 39.5 parts of an 80:20 blend of the 2,4- and 2,6-isomers of tolylene di-isocyanate. The mixture was poured into an open top mould where foaming was completed in about 1 minute. After 30 minutes the foam was removed from the mould and found to have a fine, even open cell structure, excellent resilience and a density of 2 lbs./cu. ft.

EXAMPLE 3

An organopolysiloxane of the average formula

was prepared by cohydrolysing in ether solution 162 parts of trichlorosilane, 620 parts of dimethyldichlorosilane and 217 parts of trimethylchlorosilane, removing the ether and equilibrating at 90–100° C. in presence of sulphuric acid adsorbed on a carrier clay, to yield a clear colourless liquid of viscosity 12 centistokes at 25° C. and silicon-bonded hydrogen content 0.22 percent.

A solution of 100 parts of oxyalkylated n-butanol, of molecular weight 1520 and containing equal proportions by weight of oxyethylene and oxy-1,2-propylene units, in 150 parts of toluene was heated under reflux for 1 hour to remove water by azeotropic distillation. 0.8 part of stannous octoate were then added followed by 30 parts of the organopolysiloxane described above. The mixture was thereafter heated under reflux for 5 hours during which time the theoretical amount of hydrogen was evolved. The toluene was removed by distillation under reduced pressure to yield a pale straw coloured viscous fluid copolymer.

EXAMPLE 4

A resilient polyurethane foam of fine, even texture and density 2.2 lb./cu. ft. was obtained by mixing together 100 parts of oxypropylated glycerol of average molecular weight 3000, 38 parts of an 80:20 mixture of the 2,4- and 2,6-isomers of tolylene di-isocyanate, 2.9 parts of water, 0.5 part of stannous octoate, 0.5 part of N,N-dimethylbenzylamine, 0.3 part of 4-(N,N-dimethylamino) pyridine and 1.0 part of the polysiloxane-oxyalkylene copolymer of Example 3.

EXAMPLE 5

An organopolysiloxane of the average formula

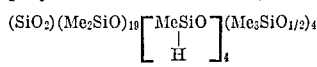

was prepared by cohydrolysing 17 parts of silicon tetrachloride, 245 parts of dimethyldichlorosilane and 46 parts of methyldichlorosilane in presence of 32.4 parts of hexamethyldisiloxane in 500 parts of diethyl ether and 600 parts of water. The water and ether were removed and the remaining mixture equilibrated by heating for 5 hours at 105–110° C. in the presence of 2 percent of aluminium oxide and 0.37 percent of concentrated sulphuric acid. There was thus obtained a clear, colourless liquid of viscosity 24.1 centistokes at 25° C. and having a silicon-bonded hydrogen content of 0.22 percent.

A solution of 50 parts of the oxyalkylated iso-octanol of average molecular weight 1530 and containing equal proportions by weight of oxyethylene and oxypropylene units and 50 parts of oxyalkylated n-butanol of average molecular weight 1680 and containing equal proportions by weight of oxyethylene and oxy-1,2-propylene units, in 150 parts of toluene were heated under reflux for 1 hour whereby water was removed by azeotropic distillation. 0.8 part of stannous octoate and 31.2 parts of the organopolysiloxane prepared as above were added thereto and the mixture heated under reflux for 7½ hours during which period the theoretical volume of hydrogen was evolved. The solvent was then removed under reduced pressure whereby there was obtained 130 parts of a pale straw coloured fluid copolymer of viscosity 1000 centistokes at 25° C.

EXAMPLE 6

100 parts of oxypropylated glycerol of average molecular weight 3000, 49.7 parts of a 80:20 mixture of 2,4- and 2,6-tolylene di-isocyanate, 4 parts of water, 0.3 part of stannous octoate, 0.08 part of triethylenediamine and 1 part of the polysiloxane-oxyalkylene copolymer prepared as described in Example 5 were mixed together. There was thus obtained a resilient polyurethane foam of fine, even texture and density 1.7 lb./cu. ft.

EXAMPLE 7

An organopolysiloxane of the average formula

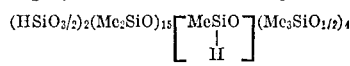

was prepared by cohydrolysing 135.5 parts of trichlorosilane, 57.5 parts of methyldichlorosilane and 967.5 parts of dimethyldichlorosilane in presence of 162 parts of hexamethyldisiloxane in 1180 parts of diethyl ether and 1680 parts of water. The water and ether were removed and the remaining mixture equilibrated by heating for 5 hours at 105–110° C. in the presence of 2 percent of aluminium oxide and 0.33 percent of concentrated sulphuric acid. There was thus obtained a clear, colourless liquid of viscosity 13.4 centistokes at 25° C. and having a silicon-bonded hydrogen content of 0.195 percent.

A solution of 50 parts of the oxyalkylated iso-octanol and 50 parts of the oxyalkylated n-butanol used in Example 5 in 150 parts of toluene were heated under reflux for 1 hour whereby water was removed by azeotropic distillation. 0.8 part of stannous octoate and 31.3 parts of the organopolysiloxane prepared as above were then added thereto and the mixture heated under reflux for 7½ hours, during which period the theoretical volume of hydrogen was evolved. The solvent was then removed under reduced pressure whereby there was obtained 130 parts of a pale, straw coloured liquid copolymer of viscosity 603 centistokes at 25° C.

EXAMPLE 8

100 parts of oxypropylated trimethylolpropane of average molecular weight 315, 145 parts of crude 4,4'-di-isocyanatodiphenylmethane, 25 parts of trichlorofluoromethane, 0.2 part of dibutyl tin dilaurate 15 parts of tribeta-chloroethyl phosphate, 1 part of N,N-dimethylcyclohexylamine and 1 part of the polysiloxane-oxyalkylene copolymer prepared as described in Example 7 were mixed together. There was thus obtained a rigid polyurethane foam of fine, even texture and density 2.8 lb./cu. ft.

EXAMPLE 9

An organopolysiloxane of the average formula

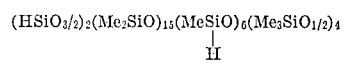

was prepared by heating together for 6 hours at 90–100° C., 100 parts of the organopolysiloxane of Example 7, 21 parts of an organopolysiloxane having the average formula

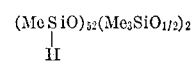

and 2.4 parts of an acid activated clay. There was thus obtained a clear, colourless oil of viscosity 15.4 centistokes at 25° C. and having a silicon-bonded hydrogen content of 0.43 percent.

A solution of 112.4 parts of oxyethylated iso-octanol of average molecular weight 535, in 160 parts of toluene was heated under reflux for ½ hour whereby water was removed by azeotropic distillation. 0.96 part of stannous octoate and 47 parts of the organopolysiloxane prepared as above were added thereto and the mixture heated under reflux for 5 hours. During this period the theoretical volume of hydrogen was evolved. The solvent was removed under reduced pressure to give 158 parts of a clear, pale straw coloured liquid copolymer of viscosity 72 centistokes at 25° C.

EXAMPLE 10

The process of Example 8 was repeated except that the polysiloxane-oxyalkylene copolymer prepared as described in Example 9 was used in place of the polysiloxane-oxyalkylene copolymer of Example 7. Similar rigid polyurethane foam of fine, even texture and density 2.8 lb./cu. ft. was obtained.

We claim:
1. Siloxane-oxyalkylene copolymers having the formulae

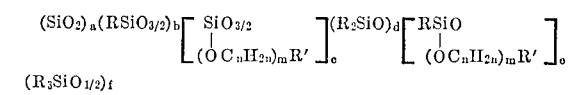

which are the products of reacting in the presence of a catalyst consisting of a carboxylic acid salt of divalent tin or lead or of dialkyl tin a monohydric alcohol having the general formula $$H(OC_nH_{2n})_mR'$$

where R' is a radical derived from a compound R'H in which the H is a hydrogen atom reactive with a cyclic oxide and selected from the group consisting of alkoxy, aryloxy, acyloxy, amino and amido, $n$ is an integer having a value of 2 to 4 inclusive, and $m$ is a positive integer of at least 4, with a siloxane of the general formula $$(SiO_2)_a(RSiO_{3/2})_b(HSiO_{3/2})_c(R_2SiO)_d\left[\begin{array}{c}RSiO\\|\\H\end{array}\right]_e(R_3SiO_{1/2})_f$$

where R is a monovalent hydrocarbon or substituted hydrocarbon group selected from alkyl, aryl, aralkyl or alkaryl groups and $a$, $b$, $c$, $d$, and $e$ are zero or a small positive number and $a+b+c$ is a positive number and $d+e$ is not less than 1 and $c+e$ is a positive number and $f$ is equal to $2a+b+c+2$.

2. The product according to claim 1 wherein the polysiloxane is of the general formula $$SiO_2(R_2SiO)_d\left[\begin{array}{c}R-SiO\\|\\H\end{array}\right]_e(R_3SiO_{1/2})_4$$

where $d$ is zero or a positive number not greater than 100, and $e$ is a positive number not greater than 100.

3. The product according to claim 1 wherein the polysiloxane is of the general formula $$RSiO_{3/2}(R_2SiO)_d\left[\begin{array}{c}R-SiO\\|\\H\end{array}\right]_e(R_3SiO_{1/2})_3$$

where $d$ is zero or a positive number not greater than 100 and $e$ is a positive number not greater than 100.

4. The product according to claim 1 wherein the polysiloxane is of the general formula $$HSiO_{3/2}(R_2SiO)_d\left[\begin{array}{c}R-SiO\\|\\H\end{array}\right]_e(R_3SiO_{1/2})_3$$

where $d$ is zero or a positive number not greater than 100 and $e$ is a positive number not greater than 100.

5. The product according to claim 1 wherein the polysiloxane is of the general formula $$HSiO_{3/2}(R_2SiO)_d\left[\begin{array}{c}R-SiO\\|\\H\end{array}\right]_e(R_3SiO_{1/2})_f$$

where $d$ is zero or a positive number not greater than 100, $e$ is a positive number not greater than 100 and $de$ is not greater than 100.

6. The product according to claim 1 wherein the polysiloxane is of the general formula $$(HSiO_{3/2})_b(R_2SiO)_d(R_3SiO_{1/2})_{b2}$$

where $b$ is a positive number not greater than 5 and $d$ is a positive number not less than $8b$ or greater than 100.

7. The product according to claim 1 wherein R is methyl, ethyl, propyl, butyl, cyclohexyl, phenyl, tolyl, benzyl or phenylethyl.

8. The product according to claim 1 wherein R' is a methoxy, ethoxy, propoxy, butoxy, octyloxy, octadecyloxy, cyclohexyloxy, benzyloxy, phenoxy, t-butylphenoxy, octylcresoxy, dimethylamino, diethylamino, phenylmethylamino, morpholino or benzoylmethylamino group.

9. The product according to claim 1 wherein the residue $(OC_nH_{2n})$ is oxyethylene, oxy-1,2-propylene, oxy-1,3-propylene, oxy-1,2-butylene or oxy-1,4-butylene.

10. The product according to claim 1 wherein the weight ratio of the total oxyalkylene groups to the polysiloxane block varies between about 0.5:1 and about 10:1.

11. The product according to claim 1 wherein the polysiloxane and the monohydric alcohol are reacted in approximately stoichiometric proportions.

12. The product according to claim 11 wherein the alcohol is used in an excess of up to 10 percent by weight.

13. The product of claim 1 wherein R is selected from lower alkyl, lower cyclo alkyl, aryl and lower alkaryl and R' is selected from an alkoxy of up to 18 carbon atoms, lower cycloalkoxy, aryl-oxy, lower acyloxy, lower alkyl amino, aryl lower alkyl amino and amido.

14. The product of claim 1 wherein $a$, $b$ and $c$ are not greater than 5 and $d$ is not greater than 100.

15. The product of claim 14 wherein $d$ is from 5 to 50.

16. The product of claim 15 wherein $e$ is not greater than 20.

17. The product of claim 16 wherein $a+b+c$ is not greater than $\frac{1}{8}(d+e)$.

References Cited

UNITED STATES PATENTS

| | | |
|---|---|---|
| 2,834,748 | 5/1958 | Bailey et al. |
| 2,917,480 | 12/1959 | Bailey et al. |
| 3,170,894 | 2/1965 | Brown et al. |
| 3,194,773 | 7/1965 | Hostettler. |
| 3,272,762 | 9/1966 | Ibbotson et al. |

TOBIAS E. LEVOW, Primary Examiner

P. F. SHAVER, Assistant Examiner

U.S. Cl. X.R.
260—2.5, 46.5, 247, 827